UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF ARTIFICIAL STONE.

SPECIFICATION forming part of Letters Patent No. 486,449, dated November 22, 1892.

Application filed December 15, 1891. Serial No. 415,184. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Artificial Stone, (Case No. 4,) of which the following is a full, clear, concise, and exact description.

My invention relates to the process and composition of matter used in the production of cement or artificial stone; and its object is to produce a stone or cement which has magnesium as a base, but which possesses the quality, heretofore wanting in magnesium artificial stones, of being proof against the attack of atmospheric and climatic influences.

In this process I take six ounces of oleic acid or any other oil which can be saponified and saponify the same by pouring it into a cold strong solution of caustic soda, stirring the same until it is thoroughly saponified. I then allow the mixture to stand until the saponified oil rises to the surface, when I take it and mix it with fifty pounds magnesium oxide and one pound concentrated solution of magnesium sulphate, and after thoroughly mixing the same I add sand or other inert substance in the proportion of one to twenty parts sand or other inert material to one part of the above-described mixture, which when thoroughly mixed becomes, though in a plastic state, a cement thoroughly and intimately saturated with insoluble metallic magnesium soap, the metallic magnesium soap protecting the stone from the influences of moisture and carbonic acid. While the material is in a plastic state it may be cast into molds of any desired form. Water may be added to make it of any desired consistency, and it may be used like plaster on walls or other surfaces.

The proportions of the various ingredients mentioned may be varied without seriously-detrimental results. I preferably, however, use the proportions above mentioned. Practically the same result may be secured by first forming the metallic magnesium soap by mixing the saponified oil, produced as already described, with a concentrated solution of magnesium sulphate, which produces the metallic soap, which can be incorporated with the magnesium oxide and solution of magnesium sulphate of 25° Baumé, after which the inert material may be added.

The best results with this process are secured by using as inert material sand, quartz, or other non-absorbent material; but sawdust or wood-pulp may be used satisfactorily, in which case more of the magnesium sulphate should be used to make up for the solution that is absorbed by the porous inert material, and thereby prevented from combining with the magnesium oxide.

The object which I secure by this invention is a thorough mechanical protection to the ingredients of the cement by intimately and thoroughly mixing the metallic magnesium soap throughout the same, which results in enveloping the elements which would be attacked by carbonic acid with an insoluble substance which is thoroughly impervious to moisture.

Having thus described my invention, what I claim as new, and desire to secure by Letters Patent, is—

1. The process of making cement, consisting of mixing saponified oil with oxysulphate of magnesium in a plastic state and while the same is still plastic adding thereto inert material, whereby the cement is rendered impervious to moisture.

2. The herein-described composition of matter for the production of artificial stone, consisting of saponified oil, magnesium oxide, magnesium sulphate, and an inert substance in substantially the proportions specified.

In witness whereof I hereunto subscribe my name this 12th day of December, A. D. 1891.

LOUIS ENRICHT.

Witnesses:
CHARLES A. BROWN,
GEORGE L. CRAGG.